(12) United States Patent
McLaughlin

(10) Patent No.: US 6,588,778 B1
(45) Date of Patent: Jul. 8, 2003

(54) ONE PIECE TRAILING ARM FOR TORSIONAL SPRINGS

(75) Inventor: Ronald J. McLaughlin, Maumee, OH (US)

(73) Assignee: The Pullman Company, Milan, OH (US)

(*) Notice: Subject to any disclaimer, the term of this patent is extended or adjusted under 35 U.S.C. 154(b) by 0 days.

(21) Appl. No.: 09/549,796

(22) Filed: Apr. 14, 2000

(51) Int. Cl.$^7$ .................... B60G 11/23; B60G 7/02; B60G 3/14
(52) U.S. Cl. .................... 280/124.13; 280/124.169; 280/124.177; 280/124.128
(58) Field of Search .................... 301/124.1, 127; 280/124.128, 124.13, 124.166, 124.169, 124.177, FOR 174, FOR 180; 267/273, 276, 279, 280, 281

(56) References Cited

U.S. PATENT DOCUMENTS

| | | | |
|---|---|---|---|
| 1,642,502 A | * 9/1927 | Krasburg | 301/127 |
| 2,002,377 A | 5/1935 | Mayne | |
| 2,171,149 A | * 8/1939 | Schroter et al. | 267/281 |
| 2,270,571 A | * 1/1942 | Woolson et al. | 267/280 |
| 2,740,623 A | * 4/1956 | Schlegel, Jr. | 267/273 |
| 2,865,031 A | * 12/1958 | Maloney | 280/124.13 |
| 3,436,069 A | 4/1969 | Henschen | |
| 3,601,424 A | 8/1971 | Badland | |
| 3,687,479 A | 8/1972 | Kober | |
| 3,779,576 A | 12/1973 | Malcolm | |
| 3,783,639 A | * 1/1974 | Goodman et al. | 266/279 |
| 3,940,553 A | * 2/1976 | Hawkins | 174/146 |
| 5,673,929 A | * 10/1997 | Alatalo | 280/124.13 |
| 5,788,265 A | 8/1998 | McLaughlin | |

FOREIGN PATENT DOCUMENTS

| | | | |
|---|---|---|---|
| CA | 602953 | | 8/1960 |
| CH | 361987 | * | 6/1962 |
| DE | 2804256 A | * | 8/1979 |
| DE | 3716311 A | * | 12/1988 |
| DE | 41 29 916 C1 | * | 1/1993 |
| GB | 652266 | | 4/1951 |
| GB | 815608 | * | 7/1959 |
| GB | 1390566 | | 4/1975 |
| IT | 459445 | | 9/1950 |
| SU | 1750986 A1 | * | 7/1992 |
| WO | WO 95/08450 | * | 3/1995 |

* cited by examiner

Primary Examiner—Paul N. Dickson
Assistant Examiner—Ruth Ilan
(74) Attorney, Agent, or Firm—Harness, Dickey & Pierce, PLC

(57) ABSTRACT

An axle assembly for a vehicle or a trailer includes an outer housing, an axle shaft and a plurality of bushings. The axle shaft is a single piece unitary construction which includes an activator shaft portion, a trailing arm portion and a spindle portion. The outer housing is adapted to be secured to the frame of the vehicle or trailer while the spindle portion is adapted to support a wheel assembly of the vehicle or trailer. Another embodiment has a single piece unitary axle which includes an activator shaft portion and a trailing arm portion. A spindle is secured to the trailing arm portion to complete the axle assembly.

12 Claims, 4 Drawing Sheets

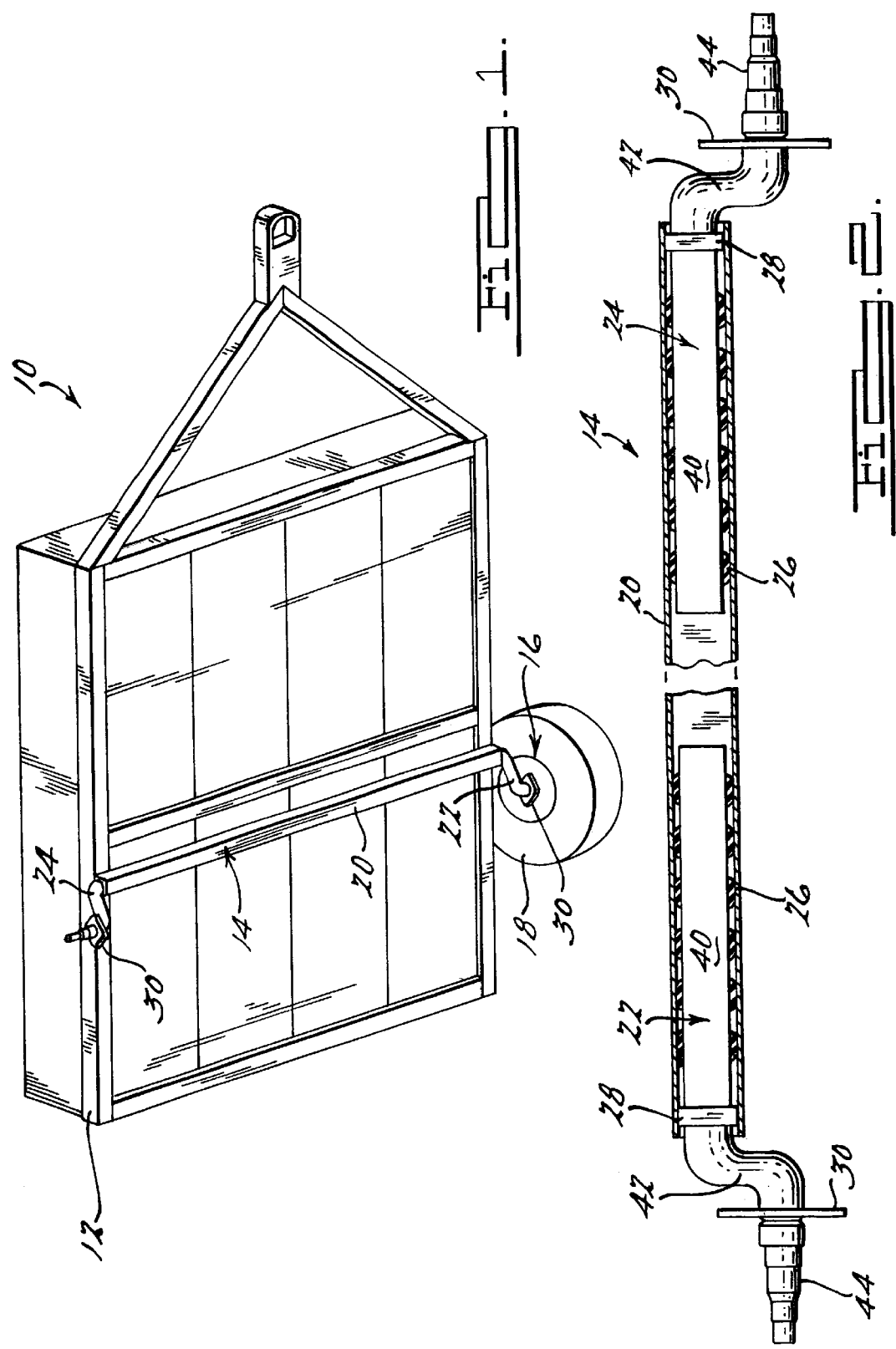

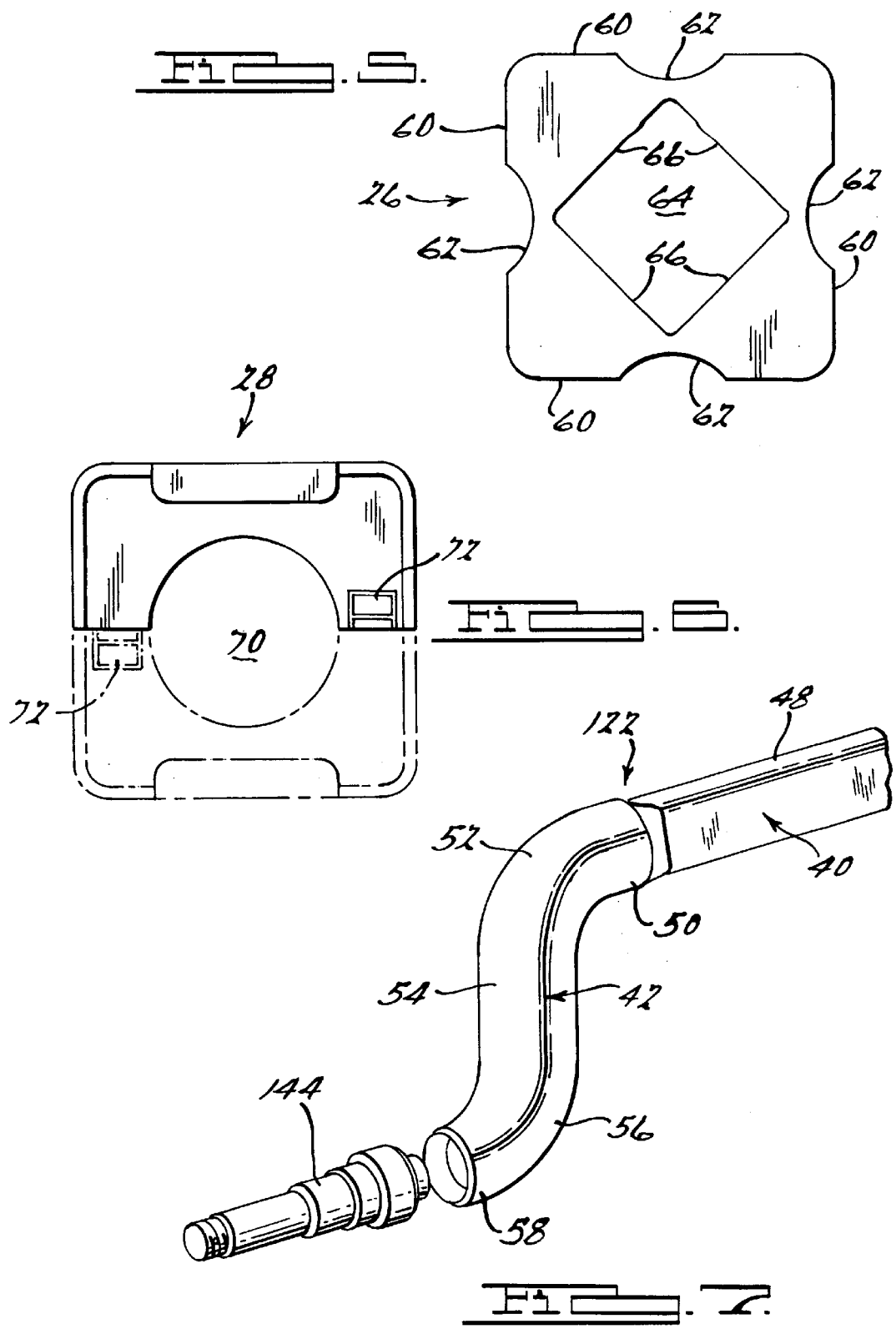

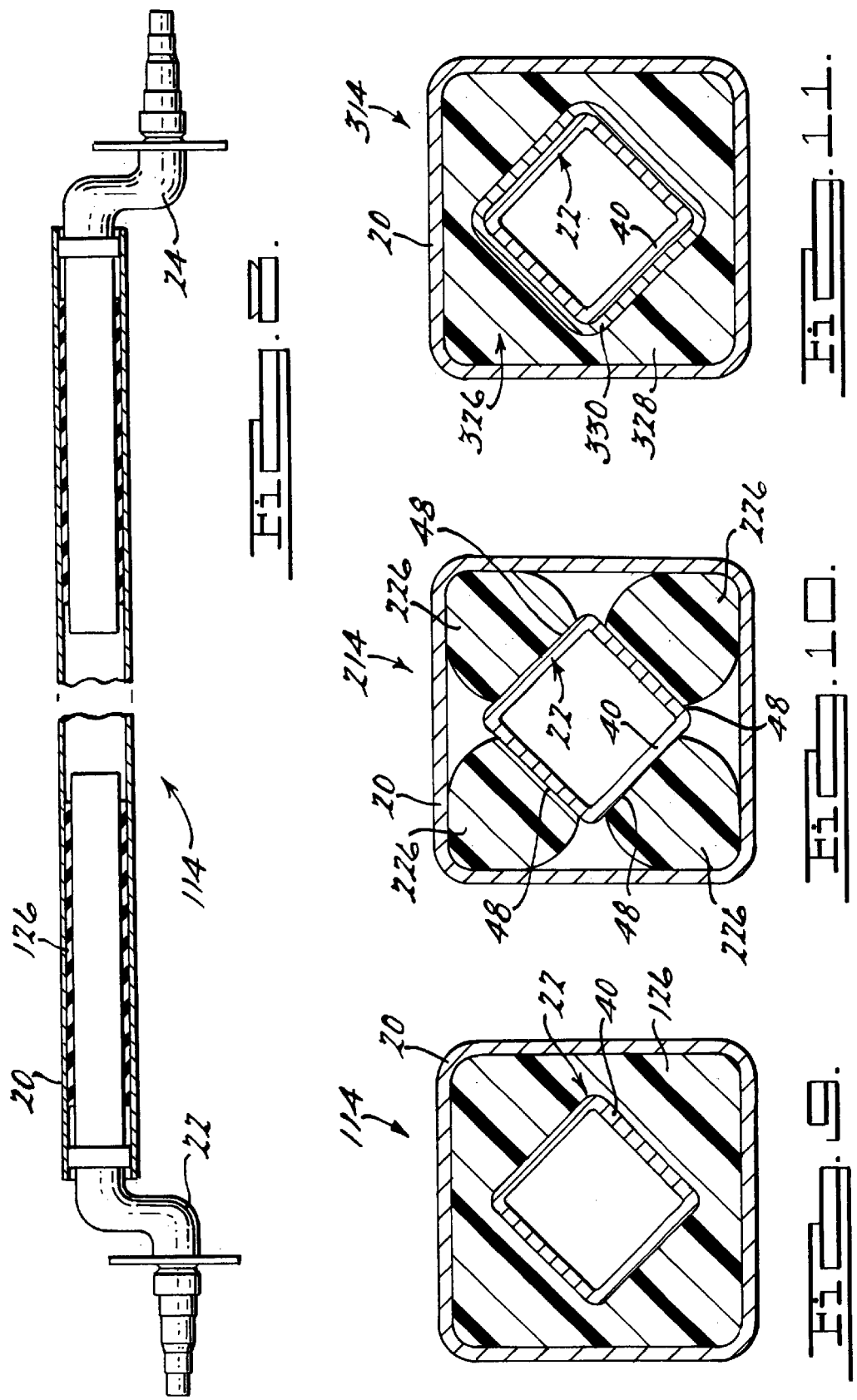

ONE PIECE TRAILING ARM FOR TORSIONAL SPRINGS

FIELD OF THE INVENTION

The present invention relates to an axle assembly for use on trailers, automobiles and other vehicles. More particularly, the present invention relates to an axle assembly which includes a pair of one piece trailing arms each having a plurality of elastomeric bushings thereon. This assembly is inserted into a housing which is then connected to the vehicle's frame.

BACKGROUND OF THE INVENTION

Trailers are designed to be attached to a conventional automobile or light truck through the use of a trailer hitch. These trailers are designed to haul some type of cargo and generally they have single or multiple axle units to support their weight and the weight of their cargo. Most trailers are rated up to about a 7000 pound capacity and this capacity can increase with the use of additional axles.

Prior art trailers have been built with steel leaf springs as a part of the axle assembly for the purpose of absorbing shock. These leaf springs are fixed to the trailer frame with the trailer's axle being positioned below the spring. This method of supporting the load and absorbing the shock is both functional and relatively inexpensive. One of the problems associated with this method of supporting the load is that a single axle will transmit shock between the two wheels. This transmission of shock increases sway, affects trailer tracking and promotes instability. In addition, if the leaf springs are not sufficiently damped, it is possible for the trailer to reach a point of resonance. This resonance could cause an uncomfortable ride, result in a loss of control of the vehicle and/or cause serious damage to the vehicle.

Because of the problems noted above and others, the trailer industry has converted over to using rubber torsional springs in the axle assemblies as a substitute for leaf springs. The rubber torsional springs are part of an axle assembly that includes an outer housing which is typically secured to the frame of a trailer, an inner member disposed within the outer housing, a plurality of bushings disposed between the inner member and the outer housing, a separate linkage or activating arm attached to the inner member and a separate spindle attached to the linkage or activating arm. The spindle has a hub attached to it which supports a wheel assembly. Rubber torsional spring axle assemblies are particularly advantageous for users of trailers that have more delicate items such as boats, horses, snowmobiles, etc. When using rubber torsional bushings, trailers generally pull better, they are not subject to resonant vibration and they provide a better overall ride.

When designing the axle assembly using rubber torsional springs, it is preferable to have the rubber work in compression rather than shear since rubber is stronger in compression and weaker in shear. Also, it is preferable to have the axle assembly permanently sealed and it is preferable to limit the number of individual components needed to assemble the axle assembly to help reduce the overall costs and complexities of the axle assembly.

SUMMARY OF THE INVENTION

The present invention provides the art with a trailer axle assembly which includes an outer housing, an inner member and a plurality of bushings disposed between the inner member and the outer member. The inner member includes a unitary longitudinal shaft, activating arm and spindle. The unitary design for the inner member reduces the number of pieces needed for the inner member along with the costs associated with machining the various individual pieces of the prior art systems.

In one embodiment of the present invention, the spindle is a separate component which is then welded to the unitary longitudinal shaft and activating arm.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention:

FIG. 1 is a partial perspective view of a trailer incorporating the unique rubber torsional spring axle assembly in accordance with the present invention;

FIG. 2 is a cross-sectional side view of the rubber torsional spring axle assembly shown in FIG. 1;

FIG. 5 is a side view of one of the bushings shown in FIG. 2;

FIG. 6 is a side view of one of the end collars shown in FIG. 2;

FIG. 7 is an exploded perspective view of a trailer axle in accordance with the present invention;

FIG. 8 is a cross-sectional side view of a rubber torsional spring axle in accordance with another embodiment of the present invention;

FIG. 9 is a cross-sectional end view of the rubber torsional spring axle shown in FIG. 8;

FIG. 10 is a cross-sectional end view of a rubber torsional spring axle in accordance with another embodiment of the present invention; and FIG. 11 is a cross-sectional end view of a rubber torsional spring axle in accordance with another embodiment of the present invention.

DETAILED DESCRIPTION OF THE PREFERRED EMBODIMENT

Figure 3:
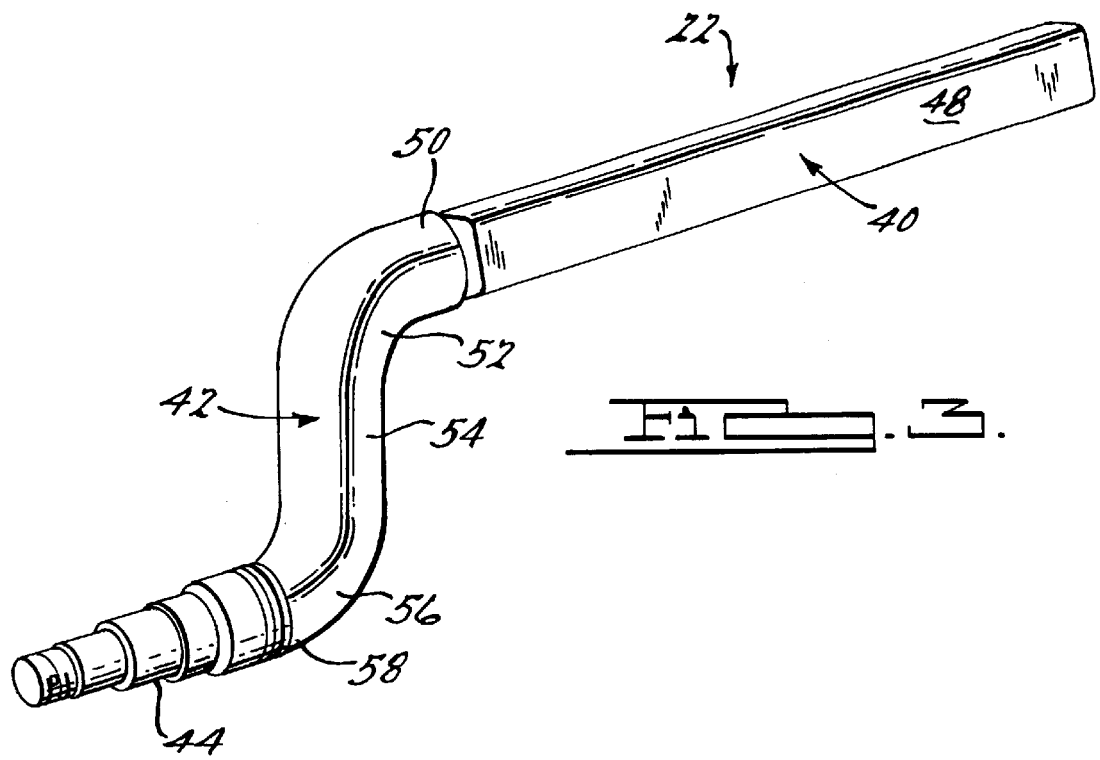
FIG. 3 is a perspective view of the trailer axle shown in FIG. 2.

Referring now to the drawings in which like reference numerals designate like or corresponding parts throughout the several views, there is shown in FIG. 1 a trailer assembly which incorporates the unique rubber torsional spring system in accordance with the present invention and which is indicated generally by the reference numeral 10. Trailer assembly 10 comprises a frame 12, an axle assembly 14 and a pair of wheel assemblies 16 (only one of which is shown). Axle assembly 14 is secured to the bottom of frame 12 by welding, clamping or other means known in the art. Wheel assembly 16 includes a tire 18 which is rotatably supported with respect to axle assembly 14 as is well known in the art. While the present invention is being illustrated for exemplary purposes in conjunction with trailer assembly 10, it is within the scope of the present invention to utilize axle assembly 14 in other applications including but not limited to the rear axle of a front wheel drive automobile or light truck.

Referring now to FIG. 2, axle assembly 14 is shown in cross-section. Axle assembly 14 comprises an outer housing 20, a left hand axle 22, a right hand axle 24, a plurality of elastomeric bushings 26, a pair of end collars 28 and a pair of backing plates 30. Outer housing 20 is a generally rectangular cross section tube which is designed to extend across the width of the trailer. Outer housing 20 is secured to frame 12 by welding, clamping or other means known in the art.

Figure 4:
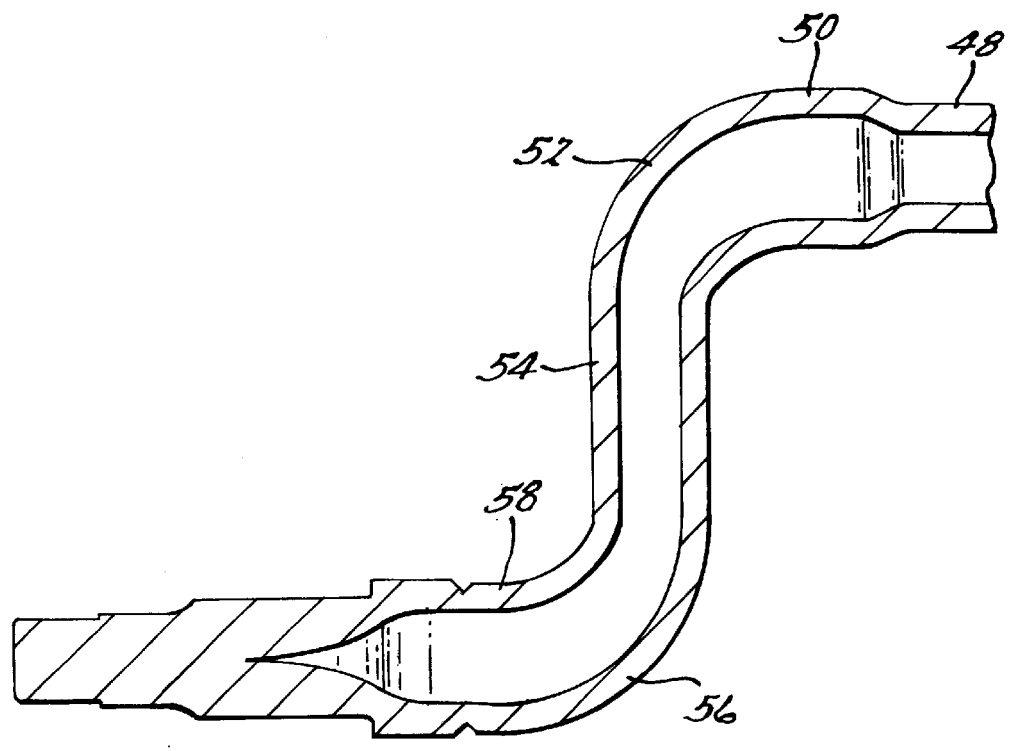
FIG. 4 is a cross-sectional side view of the trailer axle shown in FIG. 3.

Referring now to FIGS. 2–4, left hand axle 22 is a single piece formed component which includes an actuator shaft portion 40, a trailing arm portion 42 and a spindle portion 44 in one continuous shaft. The strength of left hand axle 22 is improved by using a hollow construction which increases the moment of inertia without increasing the weight of left hand axle 22. Left hand axle 22 is preferably manufactured using a hydro forming process but other manufacturing process known in the art can be used for the manufacture of left hand axle 22. Right hand axle 24 is symmetrically opposite to left hand axle 22. Thus, the detailed description for left hand axle 22 applies equally to right hand axle 24.

Actuator shaft portion 40 begins with a generally rectangular tubular end 48 which transitions into a circular section 50. The plurality of elastomeric bushings 26 are located on tubular end 48 and end collar 28 is located in circular section 50. Trailing arm portion 42 includes a first hollow transition section 52, a hollow oval section 54, a second hollow transition section 56 and a generally hollow circular section 58. First transition section 52 transforms circular section 50 into oval section 54. Second transition section 56 transforms oval section 54 into circular section 58. Circular section 58 transitions into spindle portion 44. Spindle portion 44 is machined to provide the necessary structure for supporting the various seals and bearings which are associated with wheel assembly 16. As shown in FIGS. 1 and 2, backing plate 30 is a generally rectangular plate which is secured to circular section 58 by welding or by other means known in the art. Backing plate 30 is used to support the various stationary members of wheel assembly 16.

Referring now to FIGS. 2 and 5, one of elastomeric bushings 26 is illustrated. Bushings 26 have a generally rectangular outer periphery having generally flat outer surfaces 60 each having a scalloped region 62 which is for tuning purposes. A rectangular aperture 64 having flat inner surfaces 66 extends through bushing 26. Flat inner surfaces 66 are disposed at a preferred angle of forty-five degrees with respect to the corresponding flat outer surfaces 60. It is to be appreciated that the forty-five degree offset angle could be any suitable angle, e.g., forty degrees or fifty degrees. Bushing 26 is sized to fit within outer housing 20 and over rectangular tubular end 48 of activator shaft portion 40 with a specified percent compression of bushing 26. While the present invention is being described using generally rectangular bushings 26, it is within the scope of the present invention to use other shapes including but not limited to triangular, pentagon or hexagon if desired.

Referring now to FIGS. 2 and 6, one of end collars 28 is illustrated. End collar 28 is manufactured from a stiff elastomer or other polymer bearing surface and it is generally rectangular in cross-section. Collar 28 defines a circular aperture 70 which is sized to receive circular section 50 of activator shaft portion 40. It is to be appreciated that the device shown in FIGS. 2 and 6 is actually two halves, one of which is shown in phantom in FIG. 6. The two halves mate with one another via snap members 72 to form the complete end collar.

The manufacturing and assembly process is as follows. A straight rectangular tubing member is preferably formed by a hydro forming process to produce a formed axle 22 and axle 24. Spindle portion 44 for each axle 22 and 24 is machined as well as any other surfaces on axles 22 and 24. Backing plate 30 is secured to each axle 22 and 24. The bushings 26 are molded into free rubber to have the rectangular outer shape with surfaces 60, scallops 62 and aperture 64. Preferably, an elastomer compound comprising natural rubber having various additives is used. The elastomer bushings are then bonded to tubular end 48 of activator shaft portion 40 of both axles 22 and 24 with an adhesive at room temperature. The number of bushings used for each axle 22 and 24, the spacing thereof and the precise formulation of the compound used to form the bushings may be varied depending on desired performance characteristics. In addition, any suitable adhesive may be used or, alternatively, bushings 26 could simply be friction fit on tubular end 48, bushings 26 could be molded directly to shaft portion 40 by means known in the art, or bushings 26 could be molded directly within housing 20 by means known in the art. End collar 28 is then positioned on each circular section 50 of actuator shaft portion 40 of each axle 22 and 24.

Each axle 22 and 24 with bushings 26 and end collar 28 positioned thereon is inserted into outer housing 20. As an option, the edges of housing 20 adjacent collars 28 may be crimped after assembly of axles 22 and 24 to retain collars 28 in position.

This crimping arrangement further secures the scaled chamber now surrounding bushings 26.

In operation, as wheel assembly 16 is subjected to the force and shock of the road, spindle portion 44 and trailing arm potion 42 rotate actuator shaft portion 40 so that actuator shaft portion 40 transfers the shock to inner surfaces 66 of bushings 26. Bushings 26 are then compressed between actuator shaft portion 40 and outer housing 20. As the level of the shock or force increases, so does the compression of bushings 26. Thus, bushings 26 absorb the force and shock of the road.

Referring now to FIG. 7, an axle assembly 122 in accordance with another embodiment of the present invention is discussed. Axle assembly 122 is a direct replacement for axle 22. Also, it is to be understood that a symmetrically opposite axle assembly similar to axle assembly 122 can be a direct replacement for axle 24.

Axle assembly 122 is the same as axle 22 except that spindle portion 44 has been replaced by a separate machined spindle 144. Axle assembly 122 includes activator shaft portion 40 and trailing arm portion 42. Activator shaft portion 40 begins with generally rectangular tubing end 48 which transitions into circular section 50. Trailing arm portion 42 includes first transition section 52 which transforms circular section 50 into oval section 54. Second transition section 56 transforms oval section 54 into circular section 58. Spindle 144 is secured to circular section 58 by welding or by other means known in the art. With spindle 144 secured to circular section 58, the function, operation and assembly described above for axle 22 applies to axle assembly 122 also.

Referring now to FIGS. 8 and 9, a cross-section of an axle assembly 114 is disclosed. Axle assembly 114 comprises outer housing 20, left hand axle 22, right hand axle 24 and a single elastomeric bushing 126. Bushing 126 is a mold bonded bushing. In one embodiment, bushing 126 is mold bonded to shaft portion 40 of axles 22 and 24 and press fit within outer housing 20. In another embodiment, bushing 126 is mold bonded within outer housing 20 and shaft portion 40 of axles 22 and 24 would then be press fit within the center aperture of bushings 126. The function, operation and characteristic of axle assembly 114 are the same as that described above for axle assembly 14.

Referring now to FIG. 10, a cross-section of an axle assembly 214 is disclosed. Axle assembly 214 comprises outer housing 20, left hand axle 22, right hand axle 24 and a plurality of elastomeric bushings 226. Bushings 226 are generally cylindrical shaped bushings that are positioned within the inside corners of outer housing 20 adjacent a flat wall of rectangular tubular end 48. Each bushing 226 extends continuously along shaft portion 40 similar to bushing 126 shown above in FIG. 8. The function, operation and characteristics of axle assembly 214 are the same as that described above for axle assembly 14.

Referring now to FIG. 11, a cross-section of an axle assembly 314 is disclosed. Axle assembly 314 comprises outer housing 20, left hand axle assembly 22, right hand axle assembly 24 and a plurality of elastomeric bushing assemblies 326. Each bushing assembly 326 comprises an elastomeric member 328 which is mold bonded to an inner rectangular metal member 330. Rectangular member 330 is sized to be press fit onto shaft portion 40 of each axle 22 and 24. Axle assembly 314 is assembled by press fitting the plurality of bushing assemblies 326 onto shaft portion 40 and then this assembly is inserted into outer housing 20 similar to that described above for axle assembly 14. The function, operation and characteristics of axle assembly 314 are the same as that described above for axle assembly 14.

The advantages of the present invention include the following:

1) The elastomer bushings work in compression, the most desirable use of elastomer.
2) The elastomer bushings can be molded in free shape, a low cost manufacturing process.
3) The elastomer bushings can be bonded to the inner member at room temperature with an adhesive.
4) The assembly is easily assembled into a vehicle axle assembly or housing.
5) The system is permanently sealed from penetration of road salts and moisture.
6) No welding or fasteners are required to retain the bushing assembly in the system.
7) The elastomer bushings, once installed, require a high load in order to extract the bushings from the axle assembly.
8) The elastomer bushings provide for easy adjustment of the load ratings of the system by adding or deleting bushings.
9) The mold cost and assembly equipment cost is relatively low.
10) The number of working parts is reduced and the cost is reduced.
11) The replacement of a steel spring with the elastomer spring system generally reduces the weight of the vehicle.
12) The hollow axle further reduces the weight of the system.

While the above detailed description describes the preferred embodiment of the present invention, it should be understood that the present invention is susceptible to modification, variation and alteration without deviating from the scope and fair meaning of the subjoined claims.

What is claimed is:

1. An axle assembly for use in a vehicle, said axle assembly comprising:
   an outer housing having a generally rectangular cross section, said outer housing being adapted to be secured to said vehicle;
   a first axle comprising a first activator shaft portion and a first trailing arm portion having a hollow cross section disposed adjacent to said first activator shaft portion, said first-trailing arm portion being angled with respect to said first activator shaft portion, said first activator shaft portion being disposed within said outer housing, said first activator shaft portion having a first tubular cylindrical section, a first tubular rectangular section and a first transition section disposed between said first tubular cylindrical section and said first tubular rectangular section, said first activator shaft portion defining a hollow cross section having a generally constant wall thickness; wherein,
   said first trailing arm portion includes a hollow oval section and a first hollow transition section disposed between a first end of said hollow oval section and said first tubular cylindrical section of said first activator shaft;
   said first trailing arm portion includes a second hollow transition section disposed at a second end of said hollow oval section to transition said hollow oval section from an oval shape to a cylindrical shape;
   at least one first bushing disposed between said outer housing and said first tubular rectangular section of said first activator shaft portion of said first axle; and
   at least one first end collar disposed between said outer housing and said first tubular cylindrical section of said first activator shaft portion of said first axle, said first end collar having a cylindrical aperture to receive said first tubular cylindrical section.

2. The axle assembly as claimed in claim 1, wherein the first bushing has a rectangular aperture to receive said first tubular rectangular section.

3. The axle assembly as claimed in claim 2, wherein the first bushing has a rectangular outer surface snugly received by said outer housing.

4. The axle assembly as claimed in claim 3, wherein each of a plurality of sides of said rectangular outer surface of said first bushing has a respective scalloped portion.

5. The axle assembly as claimed in claim 1, wherein:
   said at least one first bushing comprises a plurality of bushings;
   each side of the first tubular rectangular section faces a respective inside corner of the housing when said plurality of bushings is in a substantially unstressed state; and
   each of said plurality of bushings is positioned between said first tubular rectangular section and a respective inside corner of the housing.

6. The axle assembly as claimed in claim 5, wherein each of said bushings is substantially circular in an unstressed state.

7. The axle assembly according to claim 1, wherein said first axle further comprises a first spindle portion disposed adjacent said first trailing arm portion, said first spindle portion being adapted to support a wheel assembly of said vehicle.

8. The axle assembly according to claim 1, wherein said first trailing arm portion is generally perpendicular to said first activator shaft portion.

9. The axle assembly according to claim 1, further comprising:

a second axle comprising a second activator shaft portion and a second trailing arm portion disposed adjacent to said second activator shaft portion, said second trailing arm portion being angled with respect to said second activator shaft portion, said second activator shaft portion being disposed within said outer housing, said second activator shaft portion have a second tubular cylindrical section and a second tubular rectangular section, said second trailing arm portion defining a hollow cross section;

at least one second bushing disposed between said outer housing and said second tubular rectangular section of said second activator shaft portion of said second axle; and at least one second end collar disposed between said outer housing and said second tubular cylindrical section of said second activator shaft portion of said second axle, said second end collar having a cylindrical aperture to receive said cylindrical section.

10. A process for manufacturing an axle assembly for a vehicle, the process comprising the steps of:

providing a substantially rectangular tubular outer housing;

forming an axle comprising a tubular activator shaft portion having a generally constant wall thickness and a hollow trailing arm portion having an oval cross section and disposed adjacent to said tubular activator shaft portion, said hollow trailing arm portion being angled with respect to said tubular activator shaft portion, said tubular activator shaft portion including a tubular cylindrical section, a tubular rectangular section and a transition section disposed between said tubular cylindrical section and said tubular rectangular section;

forming a first hollow transition section between a first end of said oval cross-section of said hollow trailing arm and said tubular cylindrical section of said tubular activator shaft;

forming a second hollow transition section at a second end of said oval cross-section of said hollow trailing arm to transition said oval cross-section into a cylindrical cross-section;

forming at least one bushing of an elastic material;

positioning said at least one bushing on said tubular activator shaft portion of said axle; and positioning said tubular activator shaft portion into said housing such that said bushing is disposed between said tubular activator shaft portion and said housing.

11. The process as claimed in claim 10, further comprising the steps of:

providing an end collar having an aperture for receiving said tubular activator shaft portion and having an outer surface substantially matching an inside surface of said housing; and positioning said end collar around said tubular activator shaft portion before the step of positioning said tubular activator shaft portion into said housing.

12. The process as claimed in claim 10, wherein the bushing has a plurality of flat sides, and further comprising the step of forming a scalloped portion in each of said plurality of flat sides.

* * * * *